(12) United States Patent  
Park et al.

(10) Patent No.: US 12,241,604 B2
(45) Date of Patent: Mar. 4, 2025

(54) VEHICLE LIGHT LENS, VEHICLE LIGHT, AND CORRECTION SYSTEM THEREOF

(71) Applicants: Hyundai Motor Company, Seoul (KR); Kia Corporation, Seoul (KR); SL Corporation, Daegu (KR)

(72) Inventors: Sung Ho Park, Seoul (KR); Dong Eun Cha, Hwaseong-si (KR); Dong Woo Kim, Daegu (KR); Young Ho Jo, Gyeongsan-si (KR); Tae Seok Seo, Gyeongsan-si (KR)

(73) Assignees: HYUNDAI MOTOR COMPANY, Seoul (KR); KIA CORPORATION, Seoul (KR); SL CORPORATION, Daegu (KR)

( * ) Notice: Subject to any disclaimer, the term of this patent is extended or adjusted under 35 U.S.C. 154(b) by 0 days.

(21) Appl. No.: 18/225,869

(22) Filed: Jul. 25, 2023

(65) Prior Publication Data

US 2024/0125442 A1   Apr. 18, 2024

(30) Foreign Application Priority Data

Oct. 14, 2022 (KR) ........................ 10-2022-0132526

(51) Int. Cl.
*F21S 41/125* (2018.01)
*B60Q 11/00* (2006.01)
(Continued)

(52) U.S. Cl.
CPC .......... *F21S 41/125* (2018.01); *B60Q 11/005* (2013.01); *F21S 41/275* (2018.01);
(Continued)

(58) Field of Classification Search
CPC .......... F21S 41/125; F21S 41/55; F21S 41/32; F21S 43/33; F21S 43/51; F21S 43/31;
(Continued)

(56) References Cited

U.S. PATENT DOCUMENTS 8,113,695 B2   2/2012  Meinke et al.
11,204,146 B2  12/2021 Demontoux et al.
(Continued)

FOREIGN PATENT DOCUMENTS

DE   10 2018 211 457 A1   1/2020
DE   10 2022 000 054 A1   7/2022
(Continued)

OTHER PUBLICATIONS

Extended European Search Report issued on Jan. 26, 2024 in corresponding European patent application No. 23188887.6.

*Primary Examiner* — Evan P Dzierzynski
*Assistant Examiner* — Jessica M Apenteng
(74) *Attorney, Agent, or Firm* — Morgan, Lewis & Bockius LLP

(57) ABSTRACT

A vehicle light includes: a light lens having a base panel made of a transparent plastic material, an outer paint layer disposed on an outer surface of the base panel, and an inner paint layer disposed on an inner surface of the base panel and including a light-transmitting hole formed therein; and a light source installed to be spaced apart from the light lens, in which light from the light source is transmitted out of the light lens through the light-transmitting hole and the base panel.

12 Claims, 8 Drawing Sheets

(51) Int. Cl.
  *F21S 41/275* (2018.01)
  *F21S 41/32* (2018.01)
  *F21S 41/55* (2018.01)
  *F21S 43/31* (2018.01)
  *F21S 43/33* (2018.01)
  *F21S 43/50* (2018.01)
  *F21W 104/00* (2018.01)
  *H05B 45/22* (2020.01)

(52) U.S. Cl.
  CPC .............. *F21S 41/32* (2018.01); *F21S 41/55* (2018.01); *F21S 43/31* (2018.01); *F21S 43/33* (2018.01); *F21S 43/51* (2018.01); *H05B 45/22* (2020.01); *F21W 2104/00* (2018.01)

(58) Field of Classification Search
  CPC ..... F21S 41/275; H05B 45/22; G60Q 11/005; F21W 2104/00
  See application file for complete search history.

(56) References Cited

U.S. PATENT DOCUMENTS

| | | |
|---|---|---|
| 11,384,915 B1 | 7/2022 | Choo et al. |
| 2014/0192527 A1* | 7/2014 | Dowling ............ H05B 45/3725 |
| | | 362/231 |
| 2015/0291085 A1* | 10/2015 | Manning .............. B60Q 1/0408 |
| | | 362/546 |

FOREIGN PATENT DOCUMENTS

| | | | | |
|---|---|---|---|---|
| EP | 3 623 227 A1 | | 3/2020 | |
| EP | 3 815 838 A1 | | 5/2021 | |
| FR | 2 886 375 A1 | | 12/2006 | |
| GB | 2552996 A | * | 2/2018 | ............... B60Q 1/00 |
| JP | 5594604 B2 | | 9/2014 | |
| JP | 2021-005496 A | | 1/2021 | |
| KR | 10-2021-0124722 A | | 10/2021 | |
| KR | 10-2399480 B1 | | 5/2022 | |
| WO | 2020/126944 A1 | | 6/2020 | |

* cited by examiner $(\triangle C_x, \triangle C_y)$
Measurement $(\pm C_{x'}, \triangle C_{y'})$ Not turned on

100

Turned on

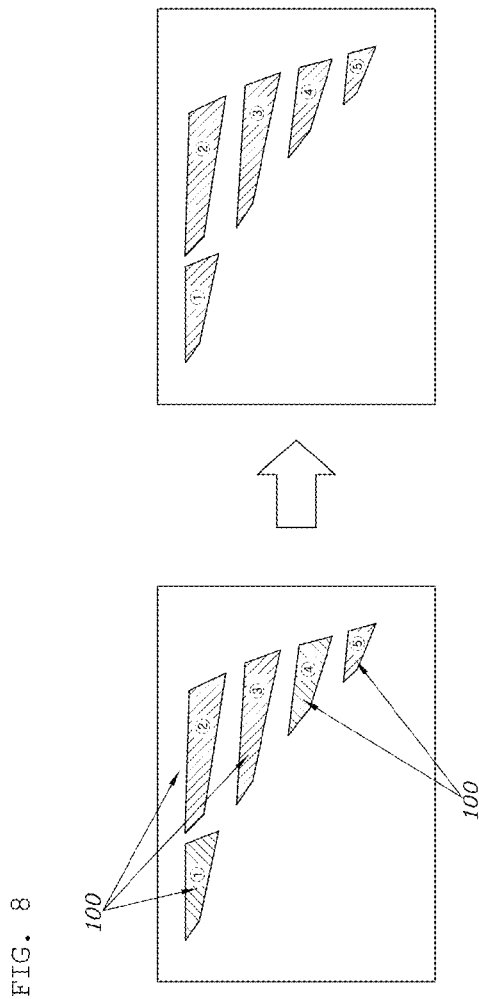

VEHICLE LIGHT LENS, VEHICLE LIGHT, AND CORRECTION SYSTEM THEREOF

CROSS-REFERENCE TO RELATED APPLICATION(S)

This application is based on and claims priority under U.S.C. 119 to Korean Patent Application No. 10-2022-0132526, filed on Oct. 14, 2022, in the Korean Intellectual Property Office, the disclosure of which is herein incorporated by reference in its entirety.

BACKGROUND

1. Technical Field

The present disclosure relates to a vehicle light lens, a vehicle light, and a correction system thereof and, more particularly, to a technology regarding a vehicle light configured to form the same color as the body of the vehicle when turned off and to become a lamp when turned on.

2. Description of the Prior Art

In general, vehicles have lighting devices for the purpose of illuminating objects in the traveling direction during nighttime driving, and lighting devices for the purpose of making the driving status of the vehicles recognized by other vehicles or road users. Headlights (also referred to as headlamps) are lighting devices for illuminating the front path in the vehicle traveling direction.

Such lamps are classified into headlamps, fog lamps, turn signals, brake lamps, and reverse lamps, which emit light in different directions with regard to the road, respectively.

Such vehicle lamps provide identification of objects by emitting light forwards from lightbulbs, and have recently lightguides applied thereto to improve the exterior design such that light is emitted with specific images.

However, vehicle lamps are limited to conventional colors, and have design-related restrictions.

The above descriptions regarding background technologies have been made only to help understanding of the background of the present disclosure, and are not to be deemed by those skilled in the art to correspond to already-known prior arts.

SUMMARY

The present disclosure has been proposed in order to solve the above-mentioned problems, and it is an aspect of the present disclosure to provide a vehicle light and a correction system thereof, such that when the vehicle light is not turned on, the same forms the same color with the body of the vehicle and, when turned on, the light can emit light to the outside with target color coordinates set by the designer.

A vehicle light lens according to the present disclosure includes: a base panel made of a transparent material and having a panel shape so as to constitute a lens of a vehicle light; an outer paint layer disposed on an outer surface of the base panel with regard to the vehicle light; and an inner paint layer disposed on an inner surface of the base panel with regard to the vehicle light and including a light-transmitting hole formed therein such that light from a light source is transmitted outwards through the base panel.

The vehicle light lens may further include a clear coating layer disposed on a surface of the outer paint layer.

The outer paint layer may be a half paint layer having a color so as to transmit the light from the light source at a predetermined ratio.

Light from the light source may be transmitted out of the vehicle light after a color coordinate change through the outer paint layer.

The outer paint layer may have an identical color as a vehicle component panel adjacent to the vehicle light.

The light-transmitting hole may be formed to penetrate the inner paint layer such that light from the light source directly reaches the base panel.

The inner paint layer may be a black primer layer configured to prevent light from the light source from directly reaching the base panel, except for the light transmitting-hole.

The base panel may have an identical material and an identical thickness as a base panel of a vehicle component panel adjacent to the vehicle light.

The outer paint layer may have an identical color and an identical thickness as an outer paint layer of a vehicle component panel adjacent to the vehicle light.

The outer paint layer may have an outer surface constitutes a common surface at an identical height with an outer surface of an outer paint layer of a vehicle component panel adjacent to the vehicle light.

A vehicle light according to the present disclosure includes: a light lens including a base panel made of a transparent plastic material, an outer paint layer disposed on an outer surface of the base panel, and an inner paint layer disposed on an inner surface of the base panel and including a light-transmitting hole formed therein; and a light source installed to be spaced apart from the light lens, in which light from the light source is transmitted out of the light lens through the light-transmitting hole and the base panel.

A vehicle light correction system according to the present disclosure includes: a light source controller configured to control the light source of the vehicle light; a memory configured to store target color coordinates which are color coordinates of light to be implemented through the vehicle light; a measurement unit disposed outside the vehicle light and configured to measure color coordinates of light emitted through the vehicle light; and a correction controller configured to control the vehicle light to generate light having target color coordinates through the light source controller, to measure color coordinates of the vehicle light through the measurement unit, and to cause the light source controller to perform color coordinate correction control of the light source as much as a difference value between the target color coordinates and the measured color coordinates.

The correction controller may derive the difference value between the target color coordinates and the measured color coordinates, and the light source controller may cause the light source to emit light after changing color coordinates as much as the difference value such that color coordinates of light measured by the measurement unit reach the target color coordinates.

The system may further include a diagnosis unit configured to measure a paint thickness of the outer paint layer, in which the correction controller calculates an amount of additional correction through a difference between the paint thickness measured by the diagnosis unit and a reference thickness, and causes the light source controller to perform color coordinate correction control of the light source so as to reflect the amount of additional correction.

A vehicle light lens, a vehicle light, and a correction thereof, according to the present disclosure, are advantageous in that, when the vehicle light is not turned on, the outer paint layer of the light lens is formed with the same color as the body of the vehicle, and there is no level difference between the light lens and an outer panel of the vehicle such that the vehicle exterior looks as if the vehicle body and the vehicle light were integrated, thereby improving the exterior appearance of the vehicle and improving the product value of the vehicle.

In addition, the color of the light source is controlled such that color coordinates of light from the light source, which are changed after passing through the outer paint layer, are controlled to reach target color coordinates, thereby observing regulations regarding the vehicle light color.

In addition, the light source is made of an RGB LED such that, by controlling the color of light from the light source, color coordinates of light emitted to the outside can reach target color coordinates by using existing paint and equipment, without a separate additional component.

BRIEF DESCRIPTION OF THE DRAWINGS

The above and other aspects, features, and advantages of the present disclosure will be more apparent from the following detailed description taken in conjunction with the accompanying drawings, in which:

FIG. 8 illustrates additional correction by a vehicle light correction system according to an embodiment of the present disclosure.

DETAILED DESCRIPTION OF THE EXEMPLARY EMBODIMENTS

Figure 1:
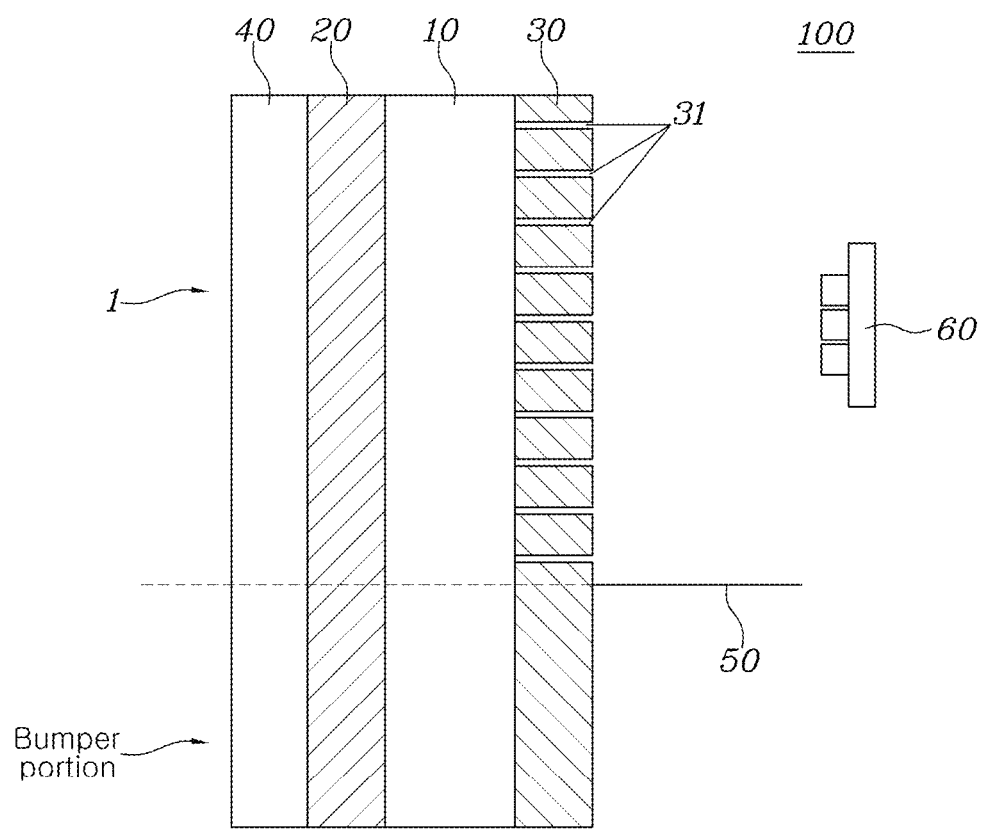
FIG. 1 is a sectional view of a vehicle light according to an embodiment of the present disclosure.

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in the context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A controller may include a communication device that communicates with other controllers or sensors in order to control functions in charge, a memory that stores an operating system or logic instructions, input/output information, and the like, and one or more processors that perform determinations, computations, decisions, and the like.

FIG. 1 is a sectional view of a vehicle light 100 according to an embodiment of the present disclosure.

An exemplary embodiment of a vehicle light lens 1 according to an embodiment of the present disclosure will now be described with reference to FIG. 1.

The vehicle light lens 1 may include multiple lenses as illustrated in FIG. 1, and details of the multiple lenses will be described later.

A vehicle light lens 1 according to an embodiment of the present disclosure includes: a base panel 10 made of a transparent material and configured in a panel shape so as to constitute the lens of the vehicle light 100; an outer paint layer 20 provided on the outer surface of the base panel 10 with regard to the vehicle light 100; and an inner paint layer 30 provided on the inner surface of the base panel 10 with regard to the vehicle light 100, a light-transmitting hole 31 being formed in the inner paint layer such that light from a light source 60 is transmitted to the outside through the base panel 10.

The base panel 10 may be formed to extend from a bumper portion and made of a transparent plastic material having an excellent optical transmittance. Accordingly, the base panel may protect the light source 60 disposed in the vehicle light 100 while transmitting light.

The outer paint layer 20 may be disposed on the outside of the base panel 10 such that, when the light source 60 disposed in the vehicle light 100 is turned on, light is transmitted to the outside through the base panel and the outer paint layer 20.

The outer paint layer 20 may be a half-paint layer having a color so as to transmit light from the light source 60 at a predetermined ratio.

FIG. 2 illustrates color coordinate conversion of the light source 60.

Figure 2A:
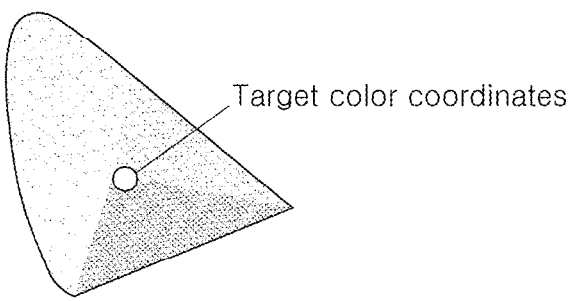
FIGS. 2A, 2B, 2C and 2D illustrate color coordinate conversion of a light source.

As illustrated in FIG. 2A, when the light source 60 emits light, the light may pass through the transparent base panel 10 and then pass through the outer paint layer 20 which is a half paint layer having a color (e.g., a paint layer with half-transparency or semi-transparency), such that the light passing through the base panel 10 and the outer paint layer 20 can have the color of the half paint layer.

In addition, the color of the outer paint layer 20 may be identical to the color of an outer paint layer 20 of a vehicle component panel adjacent to the vehicle light 100 of the vehicle, and the thickness may be identical.

As illustrated in FIG. 1, the outer paint layer 20 may have the same color as that of a vehicle component panel adjacent to the vehicle light 100 of the vehicle when the light source 60 is not turned on such that the vehicle light 100 becomes a part of the exterior of the vehicle. Such a vehicle design element may improve the aesthetic appearance of the vehicle and may emit light (main role of light 100) when the light source 60 is turned on.

The base panel 10 may have the same material and thickness as those of a base panel 10 of a vehicle component panel adjacent to the vehicle light 100. The outer surface of the outer paint layer 20 may constitute a common surface at the same height with the outer surface of an outer paint layer 20 of the vehicle component panel adjacent to the vehicle light 100.

As illustrated in FIG. 1, the base panel may be formed to extend with the same material and the same thickness as those of a vehicle component panel adjacent to the vehicle light 100, and the outer paint layer 20 may extend with same material and the same thickness as those of the vehicle component panel adjacent to the vehicle light 100, thereby being integrated with the vehicle component panel adjacent to the vehicle light 100 when the light source 60 is not turned on. When the light source 60 is turned on, only the vehicle light 100 part may emit light such that the vehicle light 100 is recognized.

As illustrated in FIG. 1, the inner paint layer 30 is provided on the inner surface of the base panel 10 with regard to the vehicle light 100, a light-transmitting hole 31 being formed in the inner paint layer 30 such that light from the light source 60 is transmitted to the outside through the base panel 10. Accordingly, light emitted by the light source 60 may be transmitted only through the portion in which the light-transmitting hole 31 is positioned. In addition, multiple light-transmitting holes 31 may be formed and disposed in positions desired by the designer.

The inner paint layer 30 may be a black primer layer such that, except for the light-transmitting holes 31, light from the light source 60 does not directly reach the base panel 10.

As a result, light emitted by the light source 60 is transmitted only through the light-transmitting holes 31, and parts other than the light-transmitting holes 31 prevent light from the light source 60 from being emitted to the outside. Therefore, the designer may configure the light-transmitting holes 31 in a desired shape such that light emitted by the light source 60 is emitted to the outside after being transmitted in the shape of the light-transmitting holes 31.

The inner paint layer 30 may be a black primer layer such that light does not pass therethrough. Light from the light source 60 may pass through the light-transmitting holes 31 formed through the inner paint layer 30 and may directly reach the base panel 10. After reaching the base panel 10, the light may successively pass through the base panel 10 and the outer paint layer 20, thereby being emitted to the outside of the vehicle.

A clear coating layer 40 may be additionally disposed on the surface of the outer paint layer 20.

The clear coating layer 40 may be a thin layer applied to the outer surface of the outer paint layer 20 to protect the outer surface thereof such that light, the color of which is changed after passing through the outer paint layer 20, can be transmitted to the outside with no change.

The clear coating layer 40 may be continuously applied to the vehicle light 100 and to a vehicle component adjacent to the vehicle light 100 as illustrated in FIG. 1 so as to improve the integrity between the vehicle light 100 and to the vehicle component adjacent to the vehicle light 100.

Accordingly, when the vehicle light 100 is not turned on, the vehicle light 100 and to the vehicle component adjacent to the vehicle light 100 appear integrated, and when the vehicle light 100 is turned on, only the vehicle light 100 may emit light.

Figure 3:
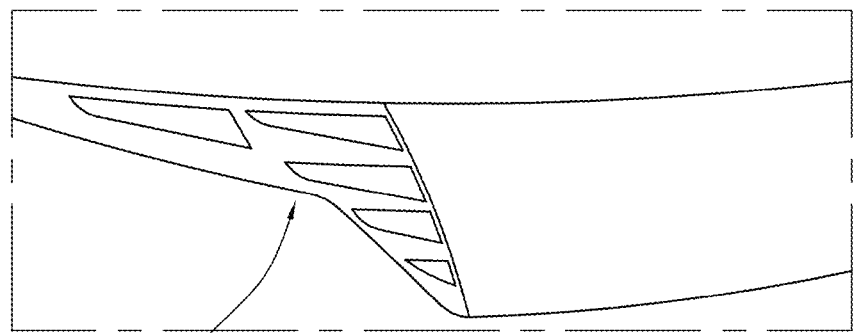
FIG. 3 illustrates a vehicle light according to an embodiment of the present disclosure.
Figure 3:
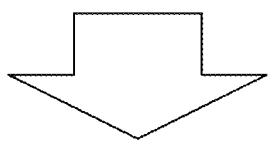
Figure 3:
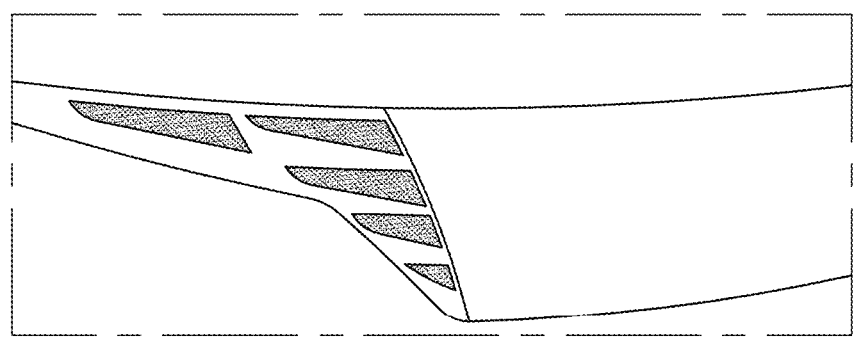
Figure 4:
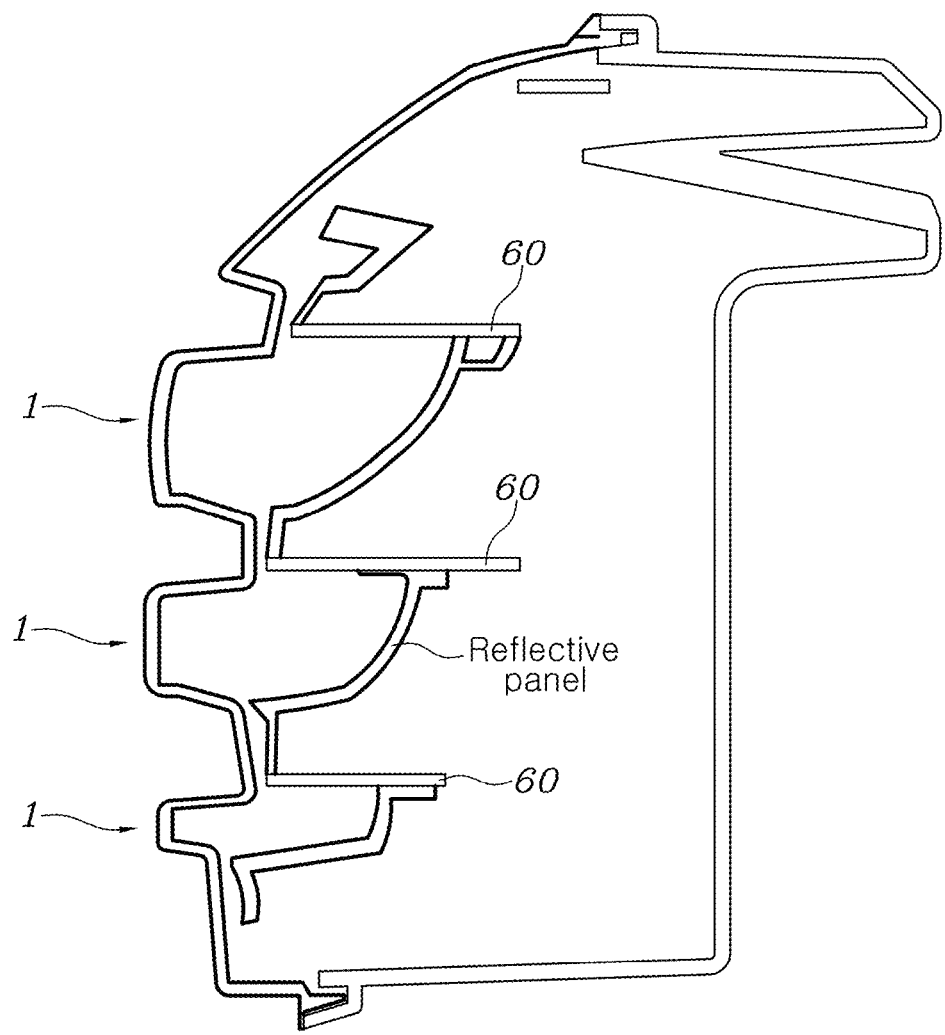
FIG. 4 is a side sectional view of FIG. 3.

FIG. 3 illustrates a vehicle light 100 according to an embodiment of the present disclosure. FIG. 4 is a side sectional view of FIG. 3.

An exemplary embodiment of a vehicle light 100 according to an embodiment of the present disclosure will now be described with reference to FIG. 1 to FIG. 4.

A vehicle light 100 according to the present disclosure may include: a light lens 1 including a base panel 10 made of a transparent material, an outer paint layer 20 provided on the outer surface of the base panel 10, and an inner paint layer 30 provided on the inner surface of the base panel 10, a light-transmitting hole 31 being formed in the inner paint layer 30; and a light source 60 installed to be spaced apart from the light lens 1. Light from the light source 60 may be transmitted to the outside of the light lens 1 through the light-transmitting hole 31 and the base panel 10.

As illustrated in FIG. 1, the vehicle light 100 includes a vehicle light lens 1 according to the present disclosure and a light source 60 disposed to be spaced apart from the inside of the light lens 1, and may further include a barrier 50 extending from the inside of the lens toward the light source 60 so as to distinguish between the vehicle light 100 and an adjacent vehicle component panel inside the vehicle.

The barrier 50 may be configured such that light from the light source 60 is emitted only toward the lens inside the vehicle light 100, thereby increasing the efficiency of light.

Light emitted from the light source 60 may undergo a color coordinate change while passing through the outer paint layer 20 formed as a half paint layer, and may then be transmitted to the outside of the vehicle light 100.

Figure 2B:
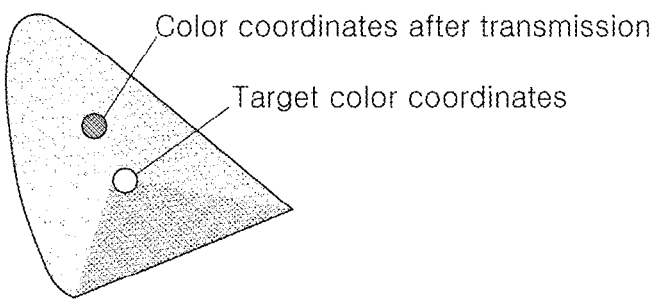

As illustrated in FIG. 2B, when light is emitted by the light source 60 and passes through the base panel 10 and the outer paint layer 20, the light emitted from the existing light source 60 may undergo a color coordinate change and may then be transmitted to the outside.

The light source 60 may be a color-changeable RGB LED such that various colors of light can be emitted. Light from the light source 60 may be emitted after a color coordinate change such that the same is exposed to the outside with target color coordinates set by the designer.

As illustrated in FIG. 3, when the light source 60 is not turned on, the vehicle light 100 lens and the vehicle body panel may maintain the same color, and when turned on, light may be emitted with the target color.

As illustrated in FIG. 4, in an embodiment of the vehicle light 100, an additional light 100 for reflecting light from the light source 60 may be inserted.

A vehicle light 100 correction system for changing color coordinates of light from the light source 60 described above will now be described.

Figure 5:
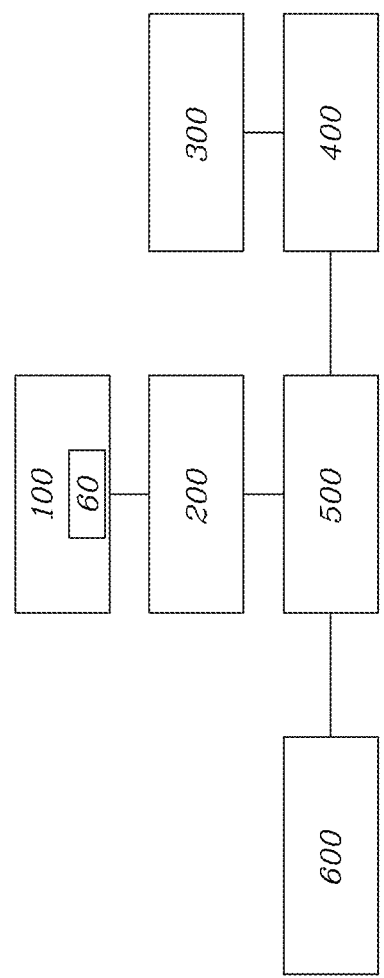
FIG. 5 illustrates the configuration of a vehicle light correction system according to an embodiment of the present disclosure.
Figure 6:
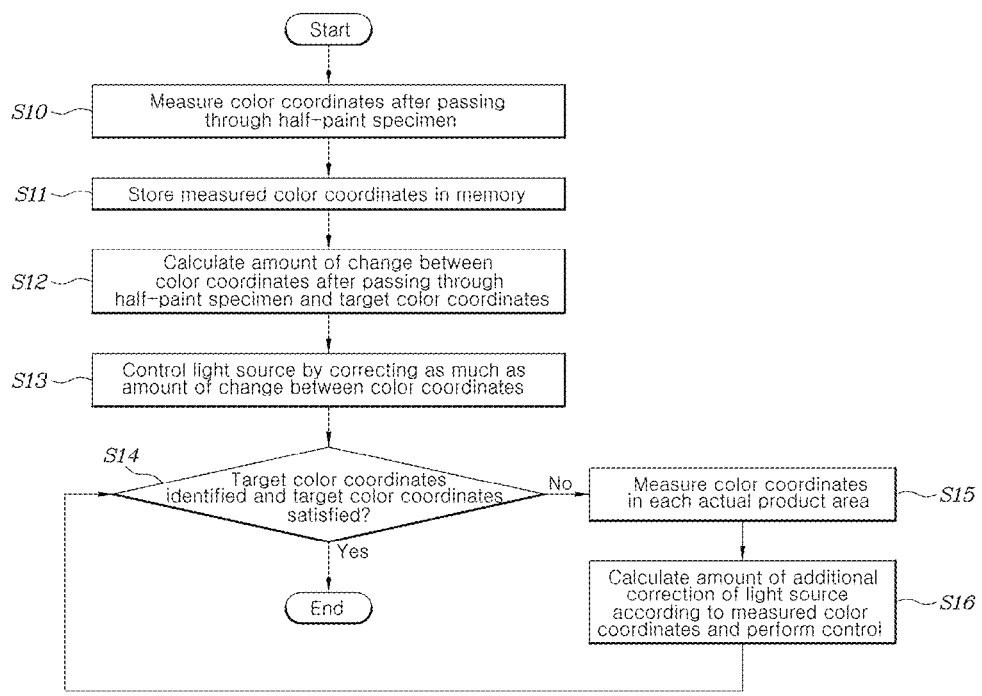
FIG. 6 and FIG. 7 are flowcharts illustrating operation of a vehicle light correction system according to an embodiment of the present disclosure.
Figure 7:
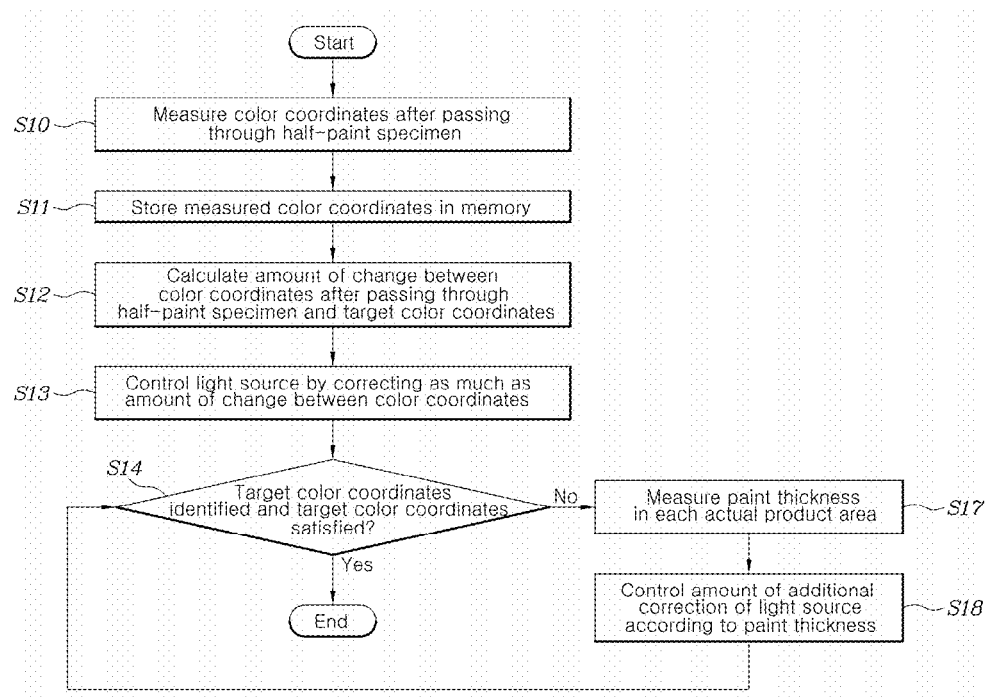

FIG. 5 illustrates the configuration of a vehicle light 100 correction system according to an embodiment of the present disclosure. FIG. 6 and FIG. 7 are flowcharts illustrating operations of the vehicle light 100 correction system according to an embodiment of the present disclosure. FIG. 8 illustrates additional correction by the vehicle light 100 correction system according to an embodiment of the present disclosure.

An exemplary embodiment of the vehicle light 100 correction system according to the present disclosure will now be described with reference to FIG. 2 to FIG. 8.

As illustrated in FIG. 5, the vehicle light 100 correction system according to the present disclosure includes: a light source controller 200 configured to control the light source 60 of the vehicle light 100; a memory 300 configured to store target color coordinates which are color coordinates of light to be implemented through the vehicle light 100; a measurement unit 400 configured to measure, while being outside the vehicle light 100, color coordinates of light emitted through the vehicle light 100; and a correction controller 500 configured to control the vehicle light 100 so as to generate light with target color coordinates through the light source controller 200, measure color coordinates of the vehicle light 100 through the measurement unit 400, and cause the light source controller 200 to perform color coordinate correction control of the light source 60 as much as the difference between the target color coordinates and the measured color coordinates.

The light source 60 may be a color-changeable RGB LED, and the light source controller 200 may control the color of the RGB LED to change.

FIG. 6 illustrates the first embodiment of the vehicle light 100 correction system according to an embodiment of the present disclosure.

Figure 2C:
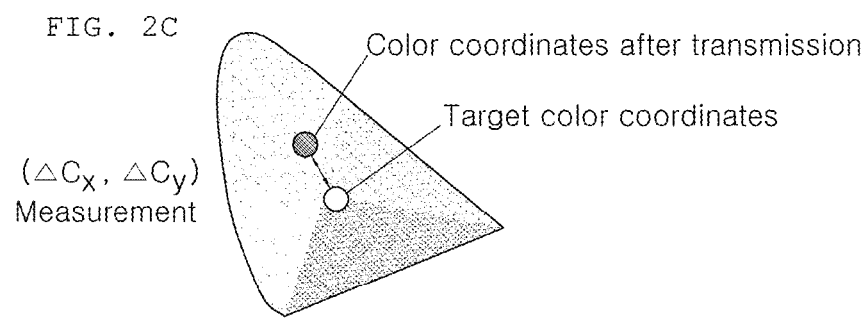

As illustrated in FIG. 2C, color coordinates of light from the light source 60, which is emitted after passing through a specimen formed with the same color as the outer paint layer 20, may be identified, and the measurement unit 400 may measure the color coordinates of the light (S10).

Color coordinates of light from the light source 60, measured by the measurement unit 400 after passing through the specimen, may be stored in the memory 300. The memory 300 may store target color coordinates, which are color coordinates of light to be implemented through the vehicle light 100 (S11).

The correction controller 500 may be connected to the memory 300 so as to calculate the amount of correction (±ΔCx, ΔCy) between the target color coordinates and the color coordinates of light that has passed through the specimen (S12), and may cause the light source controller 200 to perform color coordinate correction control of the light source 60 on the basis of the calculated amount of correction (±ΔCx, ΔCy) (S13).

As illustrated in FIG. 3, such control may turn on the light source 60, which then emits light. When passing through the light lens 1, the light may be emitted with the target color coordinates.

The correction controller 500 may control the light controller 200 in connection with an actual product such that, when the light source 60 emits light, the measurement unit 400 measures the emitted light reaching the target color coordinates, and the correction controller 500 may confirm whether the measured color coordinates satisfy the target color coordinates (S14).

As illustrated on the left in FIG. 8, it may be confirmed that parts ① and ④ (right-diagonal shading) of the vehicle light 100 fail to satisfy the target color coordinates.

An external factor, such as the thickness of paint of the outer paint layer 20, causes such a problem in that light that has passed through the light lens 1 fails to satisfy the target color coordinates.

In order to solve such a problem, additional correction of an additional light source 60 may proceed as follow:

In the first embodiment of additional correction of the light source 60, referring to FIG. 6, the correction controller 500 may derive the difference value between the target color coordinates and the measured color coordinates. The light source controller 200 may then cause the light source 60 to emit light, the color coordinates of which are changed as much as the color coordinates difference value, such that the color coordinates of light measured by the measurement unit 400 reach the target color coordinates.

The measurement unit 400 may additionally measure color coordinates of light emitted by the vehicle light 100, which requires additional correction (S15). The correction controller 500 may calculate the amount of additional correction (±ΔCx', ΔCy') for correcting the measured color coordinates to the target color coordinates, and may control the light controller 200 on the basis of the amount of additional correction (±ΔCx', ΔCy') (S16).

Figure 2D:
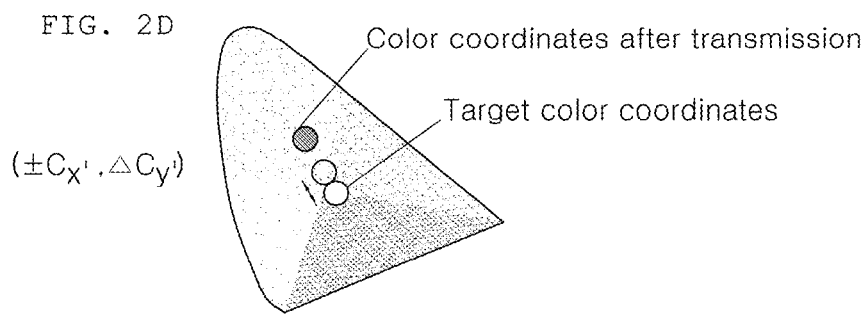

The amount of additional correction (±ΔCx', ΔCy') may be identified as illustrated in FIG. 2D.

In the second embodiment of additional correction of the light source 60, referring to FIG. 7, a diagnosis unit 600 for measuring the paint thickness of the outer paint film may be further included. The correction controller 500 may calculates the amount of additional correction (±ΔCx', ΔCy') on the basis of the difference between the paint thickness detected by the diagnosis unit 600 and a reference thickness, and may cause the light source controller 200 to perform color coordinate correction control of the light source 60 so as to reflect the amount of additional correction (±ΔCx', ΔCy').

The diagnosis unit 600 may measure the paint thickness of the outer paint layer 20 disposed on the vehicle light 100, which requires additional correction (S17). The correction controller 500 may calculate the amount of additional correction (±ΔCx', ΔCy') for correction to the target color coordinates on the basis of the measured paint thickness, and may control the light controller 200 on the basis of the amount of additional correction (±ΔCx', ΔCy') (S18).

The correction controller 500 may control the light source controller 200 such that, if the paint thickness is larger than the preset value, further correction is made as much as the inclination of the existing amount of correction (±ΔCx, ΔCy) and, if the paint thickness is smaller than the preset value, less correction is made as much as the inclination of the existing amount of correction (±ΔCx, ΔCy).

Such control of the color of the light source 60 is advantageous in that color coordinates of light from the light source, which are changed after passing through the outer paint layer 20, are controlled to reach the target color coordinates, thereby observing regulations regarding the vehicle light color.

The above system may be executed in an automated manner without operators' intervention.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A system for correcting a vehicle light comprising a light lens including a base panel made of a transparent plastic material, the base panel having an outer surface and an inner surface on opposite side to the outer surface, an outer paint layer disposed on the outer surface of the base panel, and an inner paint layer disposed on the inner surface of the base panel and having a light-transmitting hole formed therein; and a light source installed to be spaced apart from the light lens, the system comprising:
- a light source controller configured to control the light source of the vehicle light;
- a memory configured to store target color coordinates which are color coordinates of light to be implemented through the vehicle light;
- a measurement unit disposed outside the vehicle light and configured to measure color coordinates of light emitted through the vehicle light; and
- a correction controller configured to control the vehicle light to generate light having the target color coordinates through the light source controller, to measure color coordinates of the vehicle light through the measurement unit, and to cause the light source controller to perform color coordinate correction control of the light source as much as a difference value between the target color coordinates and the measured color coordinates of the vehicle light,
- wherein the inner surface of the base panel is positioned to face the light source,
- the correction controller derives the difference value between the target color coordinates and the measured color coordinates, and
- the light source controller causes the light source to emit light after changing color coordinates as much as the difference value such that color coordinates of light measured by the measurement unit reach the target color coordinates.

2. A system for correcting a vehicle light comprising a light lens including a base panel made of a transparent plastic material, an outer paint layer disposed on an outer surface of the base panel, and an inner paint layer disposed on an inner surface of the base panel and having a light-transmitting hole formed therein; and a light source installed to be spaced apart from the light lens, the system comprising:
- a light source controller configured to control the light source of the vehicle light;
- a memory configured to store target color coordinates which are color coordinates of light to be implemented through the vehicle light;
- a measurement unit disposed outside the vehicle light and configured to measure color coordinates of light emitted through the vehicle light;
- a correction controller configured to control the vehicle light to generate light having the target color coordinates through the light source controller, to measure color coordinates of the vehicle light through the measurement unit, and to cause the light source controller to perform color coordinate correction control of the light source as much as a difference value between the target color coordinates and the measured color coordinates of the vehicle light; and
- a diagnosis unit configured to measure a paint thickness of the outer paint layer,
- wherein the correction controller calculates an amount of additional correction through a difference between the paint thickness measured by the diagnosis unit and a reference thickness, and causes the light source controller to perform the color coordinate correction control of the light source so as to reflect the amount of additional correction.

3. The system of claim 1, further comprising a clear coating layer disposed on a surface of the outer paint layer.

4. The system of claim 1, wherein the outer paint layer is a half paint layer having a color so as to transmit the light from the light source at a predetermined ratio.

5. The system of claim 4, wherein the outer paint layer has an identical color as a vehicle component panel adjacent to the vehicle light.

6. The system of claim 4, wherein the outer paint layer is formed with an identical color as a vehicle component panel adjacent to the vehicle light such that the light becomes a part of a vehicle exterior when the light source is not turned on and the vehicle light emits light having target color coordinates when the light source is turned on.

7. The system of claim 1, wherein the light-transmitting hole is formed to penetrate the inner paint layer such that the light from the light source directly reaches the base panel.

8. The system of claim 1, wherein the inner paint layer is a black primer layer configured to prevent the light from the light source from directly reaching the base panel, except for the light transmitting-hole.

9. The system of claim 1, wherein the base panel has an identical material and an identical thickness as a base panel of a vehicle component panel adjacent to the vehicle light.

10. The system of claim 1, wherein the outer paint layer has an identical color and an identical thickness as an outer paint layer of a vehicle component panel adjacent to the vehicle light.

11. The system of claim 1, wherein the outer paint layer has an outer surface constitutes a common surface at an identical height with an outer surface of an outer paint layer of a vehicle component panel adjacent to the vehicle light.

12. The system of claim 1, wherein the light from the light source is transmitted out of the vehicle light after a color coordinate change through the outer paint layer.

* * * * *